United States Patent
Munje

(10) Patent No.: US 8,150,375 B2
(45) Date of Patent: *Apr. 3, 2012

(54) METHODS AND APPARATUS FOR AUTOMATICALLY RECORDING PUSH-TO-TALK (PTT) VOICE COMMUNICATIONS FOR REPLAY

(75) Inventor: Arun Munje, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 750 days.

This patent is subject to a terminal disclaimer.

(21) Appl. No.: 12/134,497

(22) Filed: Jun. 6, 2008

(65) Prior Publication Data

US 2008/0268792 A1    Oct. 30, 2008

Related U.S. Application Data

(63) Continuation of application No. 10/883,266, filed on Jun. 30, 2004, now Pat. No. 7,398,079.

(51) Int. Cl.
*H04L 12/58* (2006.01)
(52) U.S. Cl. .............. 455/412.1; 455/90.2; 455/518; 455/466; 455/414.1; 455/426.1; 455/403; 455/413; 707/101; 370/352; 370/355
(58) Field of Classification Search .............. 455/403, 455/412, 413, 414.1, 426.1, 466, 412.1, 418; 707/101; 370/352, 355
See application file for complete search history.

(56) References Cited

U.S. PATENT DOCUMENTS 4,183,354 A    1/1980 Sibley et al.
(Continued)

FOREIGN PATENT DOCUMENTS

WO    0030375 A2    5/2000
(Continued)

OTHER PUBLICATIONS

European Search Report & Written Opinion for EPO Patent Application # 06126704.3-2414, Feb. 16, 2007.
(Continued)

*Primary Examiner* — Charles Shedrick
*Assistant Examiner* — Fred Casca
(74) *Attorney, Agent, or Firm* — John J. Oskorep, Esq.

(57) ABSTRACT

In one illustrative example, a mobile station includes a wireless transceiver which operates with a wireless communication network; a processor; memory coupled to the processor; and a user interface which includes a Push-To-Talk (PTT) switch for transmitting a PTT voice communication through the wireless transceiver, a PTT replay switch for replaying a PTT voice communication previously received through the wireless transceiver which is stored in the memory, and a speaker for outputting audible voice signals. The wireless transceiver is operative to receive a PTT key message; receive voice data of a PTT voice communication following the PTT key message; and receive a PTT dekey message following the voice data. The processor is operative to cause the voice data of the PTT voice communication to be recorded in the memory based on receiving the PTT key message, and cause the recording of voice data of the PTT voice communication to be terminated based on receiving the PTT dekey message. Subsequently, in response to detecting a user actuation of the PTT replay switch, the processor causes the voice data of the PTT voice communication to be retrieved from the memory and audible voice signals corresponding to the voice data to be output from the speaker.

22 Claims, 8 Drawing Sheets

U.S. PATENT DOCUMENTS

| | | |
|---|---|---|
| 5,867,793 A | 2/1999 | Davis |
| 5,870,149 A | 2/1999 | Comroe et al. |
| 6,751,463 B1 | 6/2004 | Lorello et al. |
| 6,751,468 B1 | 6/2004 | Heubel et al. |
| 6,775,696 B1 | 8/2004 | Hansen |
| 7,062,286 B2 | 6/2006 | Grivas et al. |
| 7,136,630 B2 | 11/2006 | Xie |
| 7,398,079 B2 | 7/2008 | Munje |
| 2001/0041559 A1 | 11/2001 | Salabaschew |
| 2003/0012149 A1* | 1/2003 | Maggenti et al. ............ 370/260 |
| 2003/0224825 A1 | 12/2003 | Cox et al. |
| 2004/0203627 A1* | 10/2004 | Loomis ........................ 455/413 |
| 2004/0203793 A1 | 10/2004 | Dorenbosch |
| 2005/0164682 A1 | 7/2005 | Jenkins et al. |
| 2006/0112118 A1 | 5/2006 | Lasensky et al. |
| 2006/0121926 A1 | 6/2006 | Joung |
| 2007/0254605 A1* | 11/2007 | Zhao et al. .................. 455/90.2 |

FOREIGN PATENT DOCUMENTS

| | | |
|---|---|---|
| WO | 0137526 A1 | 5/2001 |
| WO | 2005084067 A1 | 9/2005 |

OTHER PUBLICATIONS

European Search Report & Written Opinion for Application # 04253938.3-2414, Jan. 26, 2005.

EP Search Report & Written Opinion for EP Application No. 10170702.4, Oct. 27, 2010.

European Search Report & Written Opinion for EP application #10170702.4, Oct. 4, 2010.

* cited by examiner

FIG. 1
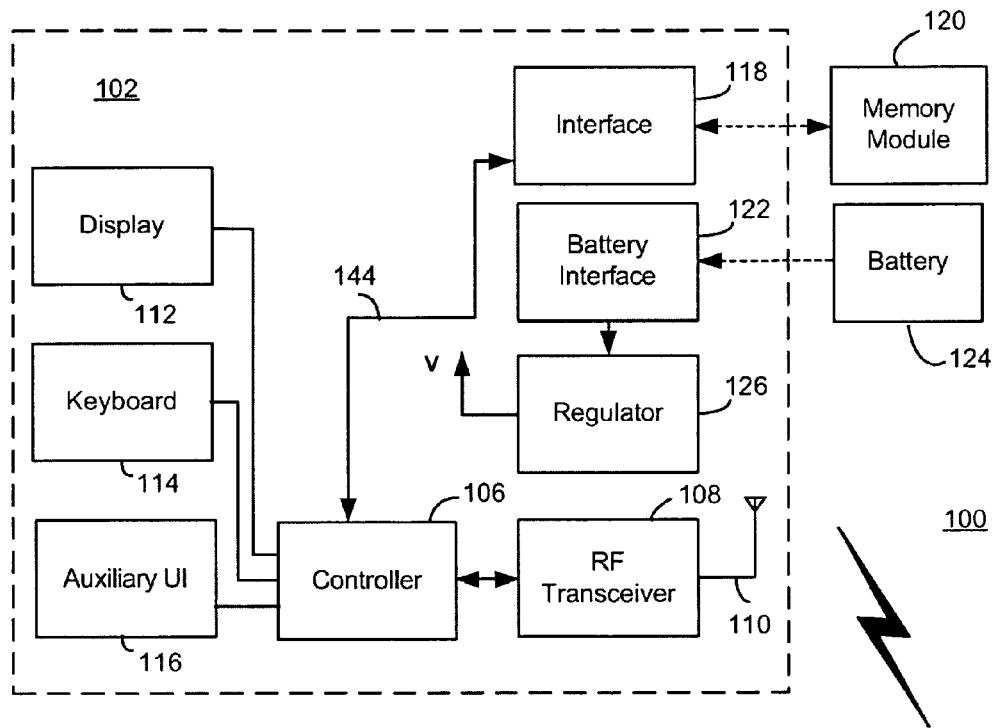
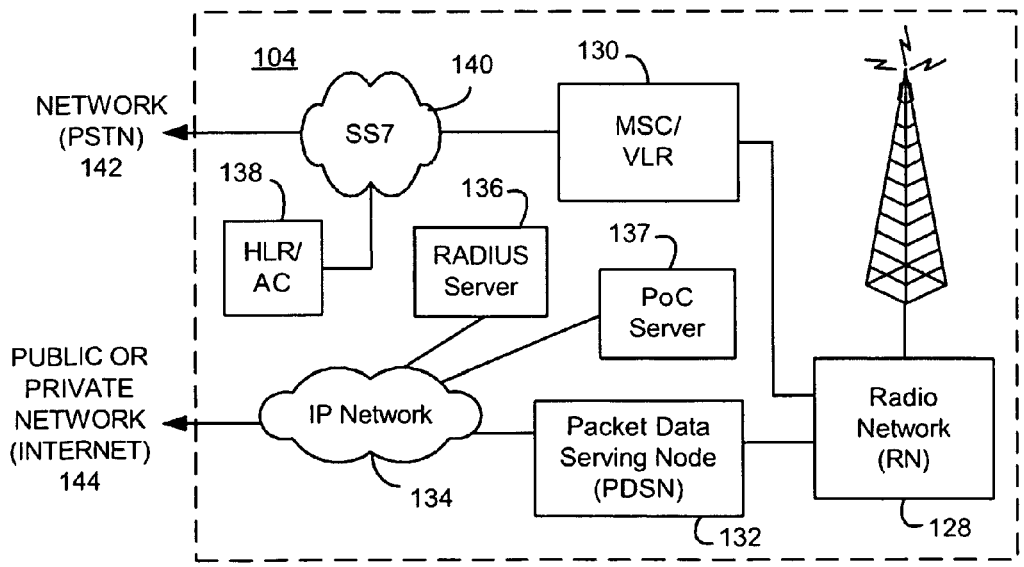

US 8,150,375 B2

METHODS AND APPARATUS FOR AUTOMATICALLY RECORDING PUSH-TO-TALK (PTT) VOICE COMMUNICATIONS FOR REPLAY

CROSS-REFERENCE TO RELATED APPLICATION

This application is a continuation application of U.S. patent application having application Ser. No. 10/883,266 and filing date of 30 Jun. 2004 entitled "Methods And Apparatus for Automatically Recording Push-To-Talk (PTT) Voice Communications For Reply," now U.S. Pat. No. 7,398,079, which is hereby incorporated by reference herein.

BACKGROUND

1. Field of the Technology

The present disclosure relates generally to Push-To-Talk (PTT) voice communications, and more particularly to methods and apparatus for recording and replaying PTT voice communications in a mobile station.

2. Description of the Related Art

A wireless communication device, such as a cellular telephone or mobile station, is capable of making and receiving voice calls and/or sending and receiving data over a wireless communication network. Some networks offer mobile stations the ability to communicate in "push-to-talk" (PTT) modes. One example of a wireless network that provides for PTT communications is an iDEN network. Other networks utilize Push-to-talk over Cellular (PoC) technology. PoC communication utilizes Voice-over-IP (VoIP) techniques which involve the communication of data packets carrying voice data.

PTT voice communications are different from traditional cellular telephony communications in that the voice communications are generally immediate and unannounced. An end user of the mobile station may be busy or caught "off-guard" and not listening to the initial communication. Thus, the end user may not hear at least the initial PTT voice communication. This is inconvenient and often wasteful of bandwidth resources, as the talk groups may have to respond to indicate that they did not hear the initial PTT communication.

Accordingly, there is a resulting need for mobile station methods and apparatus to overcome the deficiencies of the prior art.

BRIEF DESCRIPTION OF THE DRAWINGS

Embodiments of present disclosure will now be described by way of example with reference to attached figures, wherein:

FIG. 1 is a block diagram which illustrates pertinent components of a mobile station and a wireless communication network;

DETAILED DESCRIPTION OF THE PREFERRED EMBODIMENTS

Figure 2:
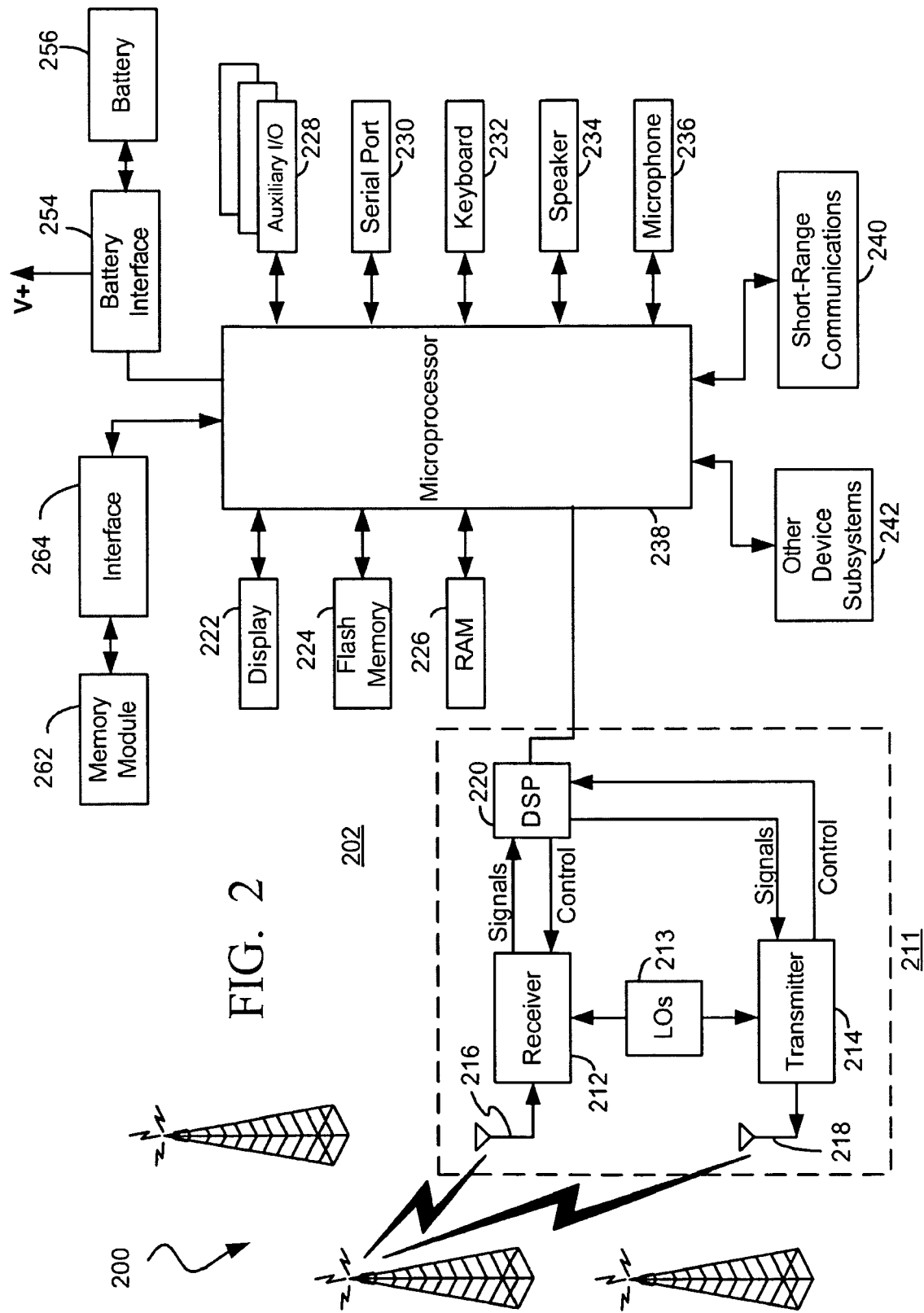
FIG. 2 is a more detailed diagram of a preferred mobile station of FIG. 1.

Methods and apparatus for automatically recording Push-To-Talk (PTT) voice communications for replay in a mobile station are described herein. In one illustrative example, a mobile station includes a wireless transceiver which operates with a wireless communication network; a processor; memory coupled to the processor; and a user interface which includes a Push-To-Talk (PTT) switch for transmitting a PTT voice communication through the wireless transceiver, a PTT replay switch for replaying a PTT voice communication previously received through the wireless transceiver which is stored in the memory, and a speaker for outputting audible voice signals. The wireless transceiver is operative to receive a PTT key message; receive voice data of a PTT voice communication following the PTT key message; and receive a PTT dekey message following the voice data. The processor is operative to cause the voice data of the PTT voice communication to be recorded in the memory based on receiving the PTT key message, and cause the recording of voice data of the PTT voice communication to be terminated based on receiving the PTT dekey message. Subsequently, in response to detecting a user actuation of the PTT replay switch, the processor causes the voice data of the PTT voice communication to be retrieved from the memory and audible voice signals corresponding to the voice data to be output from the speaker. Advantageously, PTT voice communications may be replayed in the event that the end user of the mobile station fails to initially hear such communication.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN)

128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104, which is preferably a cellular telecommunications network. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile stations 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. Although a CDMA network has been described as the environment, other suitable networks may be utilized, such as Global System for Mobile communications (GSM) and General Packet Radio Service (GPRS) network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with, as will be described in more detail later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211.

Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
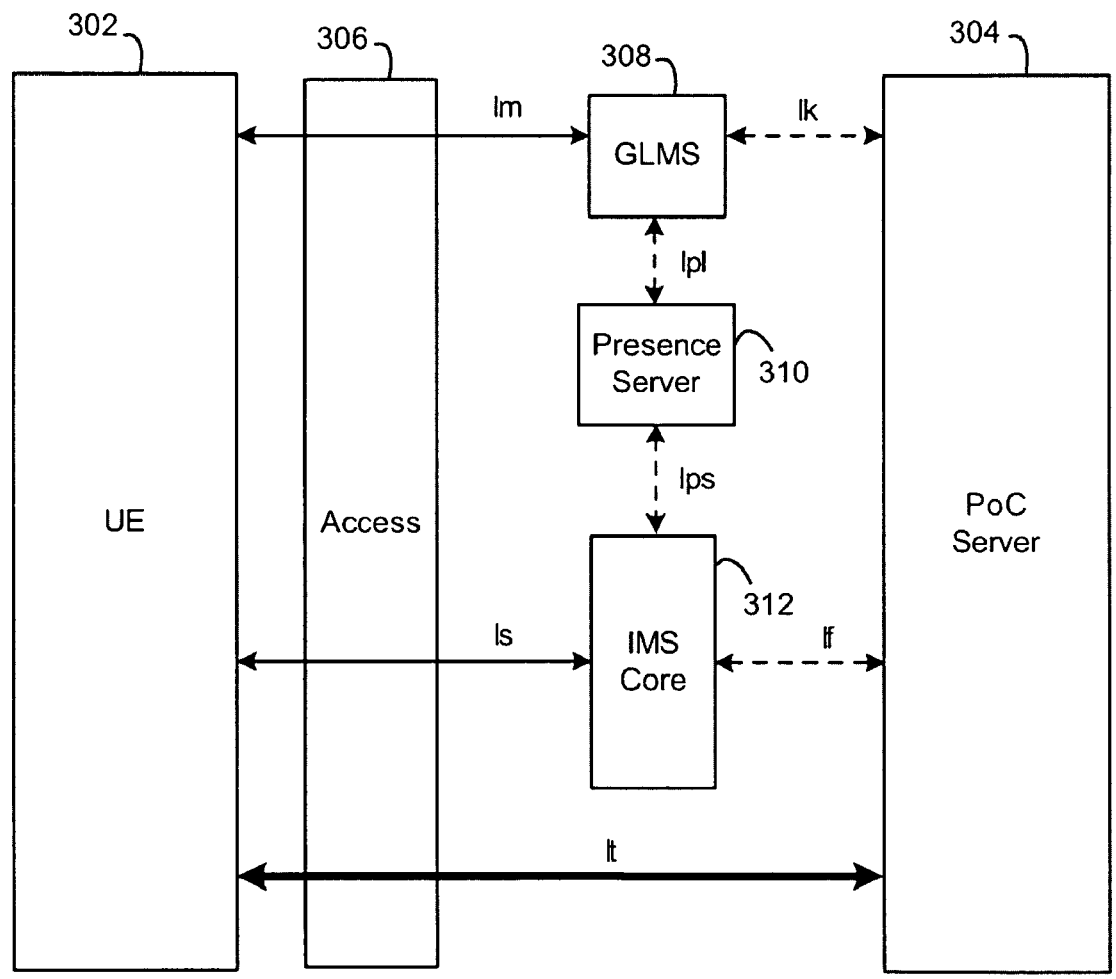
FIG. 3 is a block diagram of system components pertaining to PoC communication sessions.

FIG. 3 is a block diagram of relevant system components 300 pertaining to Push-to-talk over Cellular (PoC) communications, which may be utilized for the present techniques described herein. Alternative networks may be utilized just as well, such as an iDEN network. System components 300 in FIG. 3 include user equipment (UE) 302 which represents a mobile station, a Push-to-talk over Cellular (PoC) server 304, an access 306, a Group and List Management Server (GLMS) 308, an IP Multimedia Subsystem (IMS) core 312, and a presence server 310. Some of these components may be optional or not necessary for fundamental operation.

A PoC communication session is a session connection between end users of a UE 302, referred to as session "participants", who communicate one at a time in a half-duplex manner. PoC communication utilizes Voice over IP (VOIP) technology which involves the communication of data packets carrying voice information. UE 302 is terminal equipment (e.g. a mobile station) which includes PoC application client software, which includes functionality of the present application but otherwise utilizes conventional techniques. IMS core 312 includes a plurality of Session Initiation Protocol (SIP) proxies and SIP registrars. The first point of contact for UE 302 is one of the proxies in IMS core 312 that is configured on UE 302 as the outbound proxy. In the IMS architecture, the outbound proxy is known as the Proxy-CSCF (P-CSCF). IMS Core 312 performs the following functions: (1) routing of SIP signaling between UE 302 and PoC server 304; (2) termination of SIP compression from UE 302; (3) authentication and authorization; (4) maintenance of the registration state and the SIP session state; and (5) reporting to the charging system. UE 302 sends all its SIP messages to the IP address of the outbound proxy after resolving the SIP Uniform Resource Identifier (URI) of the outbound proxy to an IP address.

End users use GLMS 308 to manage groups, contact lists, and access lists. A contact list is a type of address book that may be used by end users to establish an instant talk session with other PoC users or PoC Groups. An end user may have one or several contact lists including identities of other PoC users or PoC groups. Contact list management includes operations to allow UE 302 to store and retrieve the contact lists located in GLMS 308. End users can define PoC groups. An end user may select one group from the list to initiate an instant group talk session or a chat group talk session, depending on the type of group. An access list is used by the end user as a means of controlling who is allowed to initiate instant talk sessions to the end user. An access list contains end user defined identities of other end users or groups. The end user may have one blocked identities list and one granted identities list.

PoC server 304 includes functionality to perform the PoC service. PoC Server 304 typically performs functions such as: (1) end-point for SIP signaling; (2) end-point for real-time transport protocol (RTP) and RTP Control Protocol (RTCP) signaling; (3) SIP session handling; (4) policy control for access to groups; (5) group session handling; (6) access control; (7) do-not-disturb functionality; (8) floor control functionality (floor control is a control mechanism that arbitrates requests, from the UEs, for the right to speak); (9) talker identification; (10) participant information; (10) quality feedback; (11) charging reports; and (12) media distribution. Presence server 310 manages presence information that is uploaded by presence user/network/external agents, and is responsible for combining the presence-related information for a certain presentity from the information it receives from multiple sources into a single presence document.

An Is interface supports the communication between UE 302 and IMS core 312. This communication includes SIP procedures which support the PoC features.

The protocol for the Is interface is Session Initiation Protocol (SIP). Is signaling is transported on User Datagram Protocol (UDP). The protocols over an If interface support the communication between IMS core 312 and PoC server 304 for session control. The protocols over an It interface support the transport of talk bursts, floor control, and link quality messages between UE 302 and PoC Server 304. The protocols over an Im interface support the communication between UE 302 and GLMS 308 for the purpose of managing the groups, contact lists and access lists and Do-not-Disturb indication. HTTP/XML protocols are utilized for these purposes. The protocols over an Ik interface support the communication between PoC Server 304 and GLMS 308, enabling PoC server 304 to retrieve the groups and access lists from GLMS 308. The protocols over an Ips interface enable the uploading of the registration status from IMS core 312 to presence server 310 and the dissemination of the presence information between presence server 310 and UE 302. The protocol over an Ipl interface enables the uploading of Do-not-Disturb status and granted/blocked access lists from GLMS 308 to presence server 310. The group identity used on the Is interface between the UE and IMS core for group talk is generated by GLMS 308.

Each entity in the PoC system is assigned one or more IP addresses belonging to public or private IP realms. On the other hand, a end user may address another user by a phone number. UE 302 sends a phone number to IMS core 312 in a TEL Uniform Resource Locator (URL). The phone number may use the international E.164 format (prefixed with a '+' sign) or a local format using a local dialing plan and prefix. IMS core 312 interprets the phone number with a leading '+' to be an E.164 number. Addressing by TEL URL for a PoC session requires that PoC Server 304 can resolve the TEL URL to a SIP URI, for instance by using DNS/ENUM or other local data base. A phone number in a local format is converted to the E.164 format before DNS/ENUM is used.

End users may initiate PoC talk sessions. An INVITE request on the Is interface contains an "Accept-Contact" header with a media feature tag indicating the PoC service. IMS core 312 is able to identify the request as a PoC communication by inspecting the Accept-Contact header. A Request-URI of the INVITE contains either the pre-configured ad-hoc identity (for instant personal talk and ad-hoc instant group) or a group identity (for instant group talk or chat group talk). Early session establishment is used for having a session available for quick connection establishment using "REFER". The early session establishment's INVITE does not have any referred party field and can be differentiated from this against other INVITEs. A transient group identity is generated by PoC server 304 and distributed to UE 302 in the "Contact" header. From an initiating UE 302, the public user identity of the inviting user is included in the "From" header. On the signaling towards the invited user, the "From" header includes either the public user identity (instant personal talk, ad-hoc instant group) or the group identity (instant group talk or being added to a chat group).

Other than the inventive techniques described herein, the PoC architecture and signaling may be the same as is conventional as described in current standard specifications such as Push-to-talk over Cellular (PoC), Architecture, PoC Release 1.0—Architecture V1.1.0 (2003-08) Technical Specification; and Push-to-talk over Cellular (PoC), Signaling Flows, PoC Release 1.0—Signaling Flows V1.1.3 (2003-08) Technical Specification. In addition, although the PoC architecture and signaling has been provided as the exemplary environment for the techniques of the present application, any suitable network and techniques for PTT voice communications may be utilized. For example, the wireless network may be an iDEN network which provides for PTT communications between mobile stations.

Figure 4:
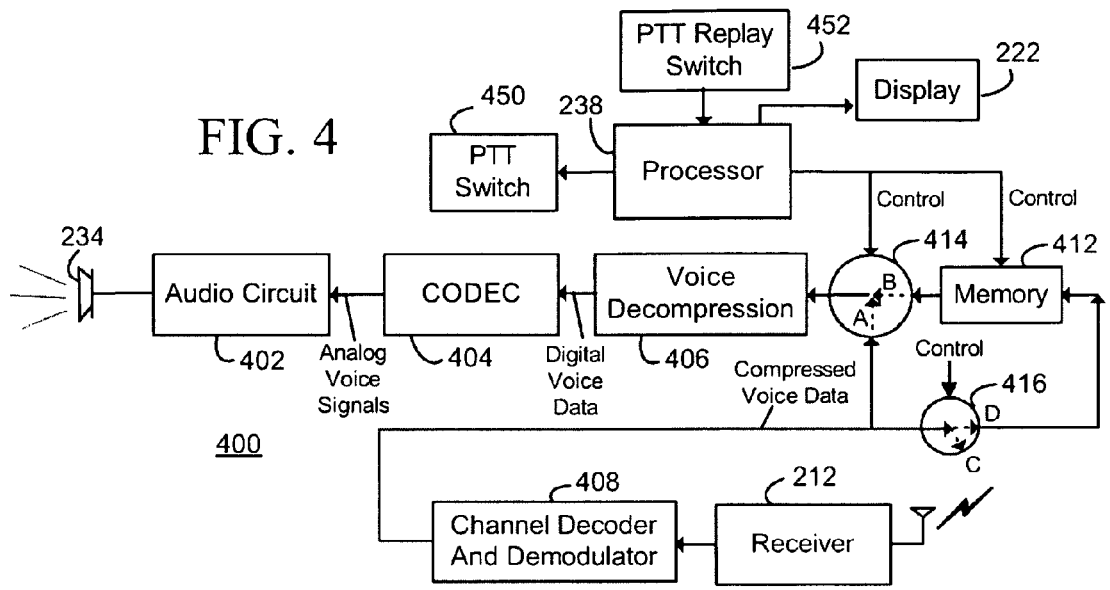
FIG. 4 is a schematic block diagram of pertinent electrical components for the automatic recording of PTT voice communications for replay in the mobile station of FIGS. 1-2.

FIG. 4 is a schematic block diagram of pertinent electrical components 400 of the mobile station of FIGS. 1-2 for automatically recording PTT voice communications for replay. As shown, electrical components 400 include speaker 234, an audio circuit 402, a coder/decoder (CODEC) 404, a voice decompressor 406, a switch 414, a memory 412, a switch 416, a channel decoder and demodulator 408, a receiver 212, processor 238, and a user interface which includes display 222, a PTT communication switch 450, and a PTT replay switch 452, all coupled together as shown. Receiver 212 receives RF signals from the wireless network through the antenna. The RF signals may carry a PTT voice communication from another mobile station. The RF signals are passed to an input of channel decoder and demodulator 408 which decodes and demodulates the signals, to thereby produce compressed voice data.

For telephony communication (e.g. cellular telephone calls), the compressed voice data is passed to an input of voice decompressor 406 which decompresses the incoming data. This decompression step increases the data rate of the incoming data. Thus, the data rate at the output of voice decompressor 406 (e.g. 64 kbps) is typically substantially higher than the data rate at the output of channel decoder and demodulator 408 (e.g. 8 kbps). Specifically, the digital voice data at the output of voice decompressor 406 may be pulse-coded modulated (PCM) data signals. This digital voice data is passed to CODEC 404, which typically includes conventional voice processing circuits such as one or more amplifiers, one or more filters, and a digital-to-analog (D/A) converter. Thus, CODEC 404 converts digital voice data into analog voice signals and has an output that provides the analog voice signals. The output of CODEC 404 is coupled to an input of audio circuit 402, which includes circuitry for biasing, filtering, and amplifying the analog voice signals. This produces audible voice signals at speaker 234.

Memory 412 is used to store compressed voice data of received PTT voice communications, as will be described further herein. A first input of switch 414 is coupled to the output of channel coder and demodulator 408, a second input of switch 414 is coupled to an output of memory 412, and an output of switch 414 is coupled to the input of voice decompressor 406. When a switch position "A" is set for switch 414, compressed voice data from channel decoder and demodulator 408 is routed to the input of voice decompressor 406. When a switch position "B" is set for switch 414, compressed voice data from memory 412 is routed to the input of voice decompressor 406. For recording received PTT voice communications, an input of memory 412 is coupled to the output of channel decoder and demodulator 418 through switch 416. Switch 416 may be set to a switch position "D" to couple the output of channel decoder and demodulator 418 to the input of memory 412, or to a switch position "C" which opens the switch so that no compressed voice data is received by memory 412.

Processor 238 controls switches 414 and 416 to be in one of three different switch configurations depending on the desired operation. In a first configuration, processor 238 controls switch 414 to be in switch position A and switch 416 to be in switch position C for the conventional listening of voice without recording. In a second configuration, processor 238 controls switch 414 to be in switch position A and switch 416 to be in switch position D for the conventional listening of voice with simultaneous recording in memory 412. In a third configuration, processor 238 controls switch 414 to be in switch position B and switch 416 to be in switch position C for the listening of previously recorded voice from memory 412. This listening may be prompted by an actuation of PTT replay switch 452, which may be a normal push-button switch or a switch activated by an insertion of a headset into the mobile station, for example.

Figure 5:
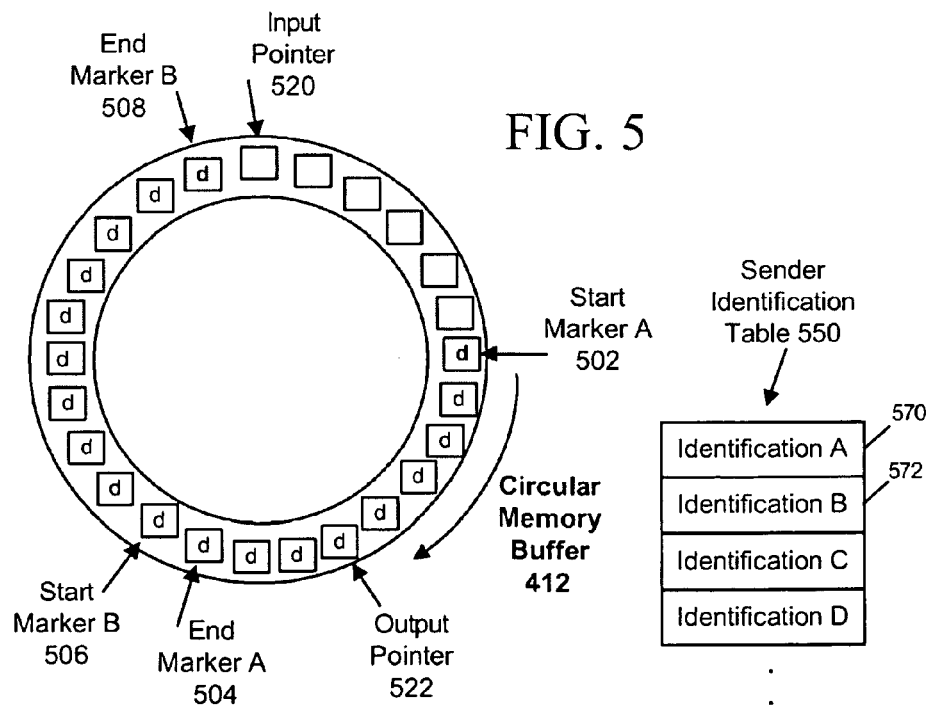
FIG. 5 is an illustrative representation of a circular buffer memory of the schematic block diagram of FIG. 4.

FIG. 5 is an illustrative representation of memory 412 of the schematic block diagram of FIG. 4. As illustrated, memory 412 which stores voice data is a circular buffer memory of the First-In-First-Out (FIFO) type. Each square in FIG. 5 represents a separate memory location or block which is separately addressable. Using circular buffering, voice data is saved in a consecutive fashion in memory 412 such that older voice data is written over by newer voice data in a loop-type fashion. Note that the size of memory 412 is sufficient to buffer an amount of voice data for at least one typical PTT voice communication.

A pair of start and end markers 502 and 504 ("markers A") are used for memory 412 define the boundaries of a single previously-saved PTT voice communication. Start marker 502 is used to identify a beginning of the PTT voice communication, and an end marker 504 is used to identify the end of the PTT voice communication. Start and end markers 502 and 504 may be in the form of address pointers stored in another portion of memory 412 which "point" to the appropriate location in memory 412. Thus, start marker 502 is a pointer address corresponding to a memory location of the beginning of the PTT voice communication, and end marker 504 is a pointer address corresponding to a memory location of an end of the PTT voice communication. Note that more than one PTT voice communication can be saved in memory 412 and, therefore, one or more other pairs of start and end markers 506 and 508 (markers "B") are provided for memory 412. Preferably, a plurality of PTT voice communications are consecutively saved in memory 412 which have corresponding pairs of start and end markers for identification and retrieval.

An input pointer 520 in memory 412 identifies a next available memory location for saving voice data for a PTT voice communication. On the other hand, an output pointer 508 identifies the next memory location corresponding to the voice data of the PTT voice communication to be replayed. Input and output pointers 520 and 522 may be stored in another portion of memory to "point" to the appropriate location within memory 412. When voice data of a new PTT voice communication is being saved in memory 412, input pointer 520 is incremented (or decremented) accordingly to appropriately sequentially read in the voice data from channel decoder and demodulator 408 (FIG. 4). On the other hand, when voice data of a previously saved PTT voice communication is being replayed, output pointer 522 is incremented (or decremented) accordingly to appropriately sequentially output the voice data of the PTT voice communication for processing by voice decompressor 406, CODEC 404, audio circuit 402, and speaker 234 (FIG. 4).

Figure 8:
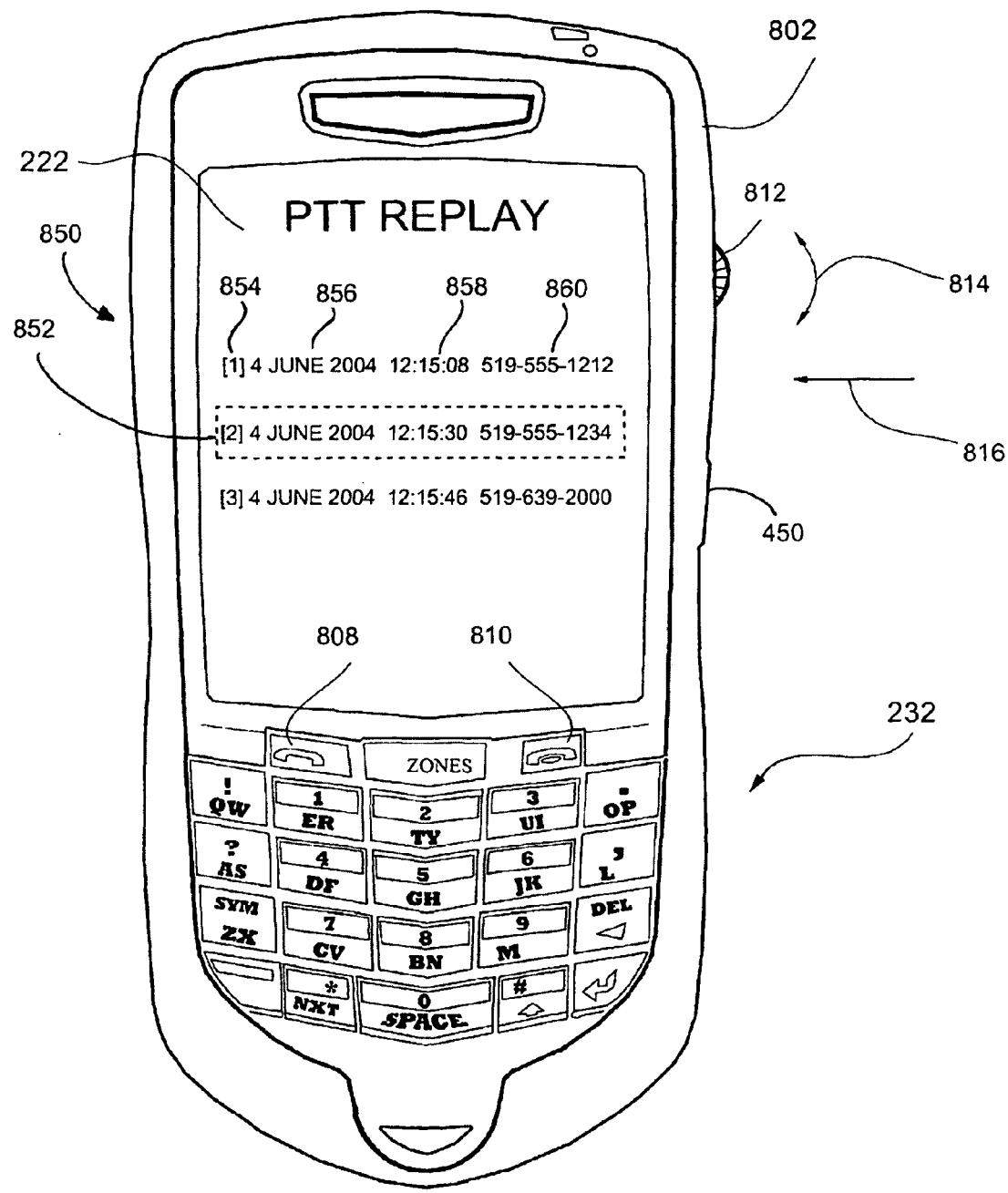
FIG. 8 is an exemplary illustration of a mobile station showing a user interface for replaying the previously recorded PTT voice communications.

Referring ahead to FIG. 8, a visual illustration of a front side of an exemplary mobile station having a user interface for replaying previously recorded PTT voice communications is shown. The mobile station of FIG. 8 has a housing 802 which contains the electronic circuitry and components shown and described in relation to FIGS. 1-2. Housing 802 of mobile station 202 includes a user interface having visual display 222 and keypad 232 with a plurality of keys as generally earlier shown and described in relation to FIG. 2.

The plurality of keys of keypad 232 include a plurality of telephone digit keys (0, 1, 2, 3, 4, 5, 6, 7, 8, 9, *, and #) as well as control keys including a SEND key 808 (having a telephone handset icon inscribed thereon) and an END key 810 (having a telephone handset hang-up icon inscribed thereon). SEND and END keys 808 and 810 are mechanical switches of the mobile station which are detectable at switch inputs of the mobile station. In general, SEND key 808 is used by the end user for initiating a telephone call from mobile station 202 through the wireless network, and END key 810 is used by the end user for terminating the telephone call. Note that both SEND and END keys 808 and 810 are carried and exposed on a front side of housing 802.

The plurality of keys also include a PTT voice communication switch 450. In this embodiment, PTT switch 450 is located on a right hand side of housing 802.

When PTT switch 450 is depressed by an end user, the mobile station initiates a PTT voice communication through the wireless network. After PTT switch 450 depression, audible voice signals are received at the microphone of the mobile station and voice signals are transmitted through the wireless network and heard at certain other mobile stations. Unlike traditional telephone calls, PTT voice communications are relatively immediate and do not require the entry or selection of the recipient's telephone number.

Display 222 is used to visually display indicators for PTT voice communications that were previously received by and recorded by the mobile station. In this example, a list 850 of three PTT voice record indicators are displayed for review by the end user. However, any suitable number of PTT voice record indicators may be displayed. Each indicator in list 850 comprises a line of text. One example is a PTT voice record indicator 852 which is representative of the other PTT voice record indicators within list 850. As shown, PTT voice record indicator 852 includes a PTT sequence count 854, a date stamp 856, a time stamp 858, and a sender identification 860. Note that this information is merely an illustrative example of what may be provided in visual display 222 and the invention is not limited to such information.

Each PTT voice communication within a PTT session may be uniquely identified by PTT sequence count 854 which is indicative of the order in which the PTT voice communication was submitted. To obtain PTT sequence count 854, the processor of the mobile station keeps track and increments a counter for each next PTT voice communication received and stored for the PTT session. As shown, PTT voice record indicator 852 is the first ("[1]") communication of the PTT session. Data stamp 856 (4 Jun. 2004) and time stamp 858 (12:15:08) indicate the date and time, respectively, of the particular PTT voice communication. This information may be derived from existing applications at the mobile station or, alternatively, may be received during the PTT voice communication in a control message. Sender identification 860 uniquely identifies the sender or end user (mobile station) of the PTT voice communication. In this embodiment, sender identification 860 is a telephone number ("519-555-1212") of the sending mobile station. Sender identification 860 is received in a control message from the sending mobile station just before the PTT voice communication from the mobile station.

The user interface of FIG. 3 also includes a data item selection mechanism for use with visual display 222. The selection mechanism is used with visual display 222 for selecting and replaying the recorded PTT voice communications. In the present embodiment, the selection mechanism of the mobile station is a scrollwheel 812. Scrollwheel 812 is positioned on a right hand side of housing 302. Scrollwheel 812 generally includes a circular disc which is rotable about a fixed axis of housing 802, and may be rotated by the end user's index finger or thumb. See the directions indicated by a rotation arrow 814 of scrollwheel 812 shown in FIG. 8. An upwards rotation of scrollwheel 812 causes an upwards scrolling such that data items visual display 222. Similarly, a downwards rotation of scrollwheel 812 causes a downwards scrolling such that visual display 222 presents viewing of a lower portion of the information. Note also that scrollwheel 812 is mounted along a fixed linear axis such that the end user can depress scrollwheel 812 inwards toward housing 812 (e.g. with the end user's index finger or thumb) for selection of data items. See the directions indicated by an arrow 816 of scrollwheel 812.

Figure 9:
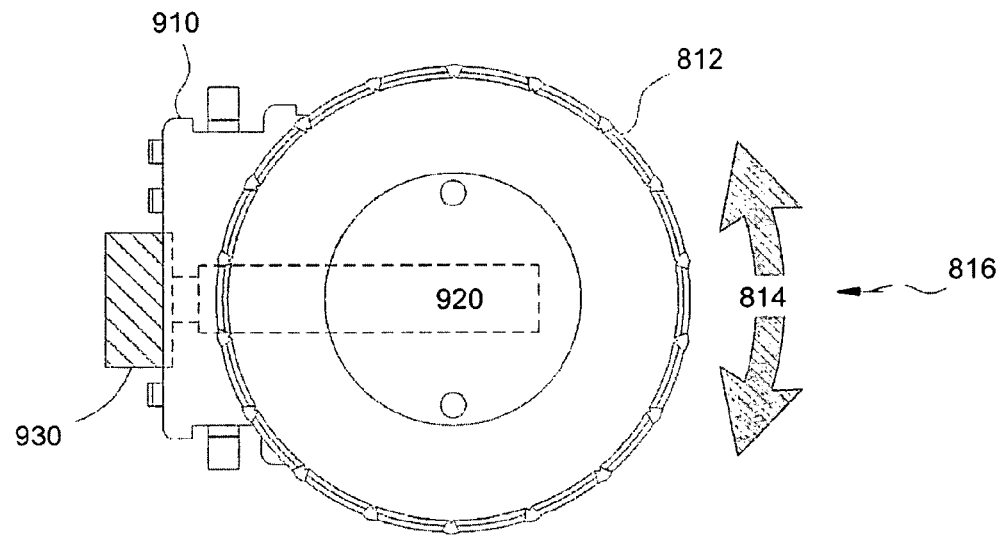
FIG. 9 is a plan view of a scrollwheel that may be utilized for replaying PTT voice communications.
Figure 10:
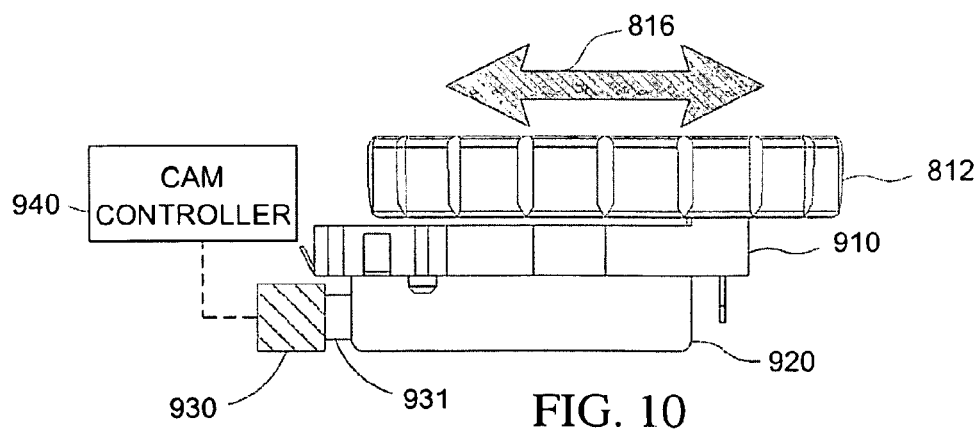
FIG. 10 is a side view of the scrollwheel of FIG. 9.

A more detailed mechanism for scrollwheel 812 is now described in relation to FIGS. 9 and 10. Scrollwheel 812 of FIGS. 9-10 is shown connected to and rotatable about a body assembly 910. Body assembly 910 may be connected to or be part of a slide assembly 920. Slide assembly 920 allows the entirety of scrollwheel 812 and body assembly 910 to move freely laterally 816 with respect to the handheld device. Lateral scrollwheel movement 816 is defined as movement along a plane normal to the rotational axis of scrollwheel 812. To control this lateral movement 812, slide assembly 920 may be connected to a control mechanism such as a cam mechanism 930 with a cam 931, or alternatively a level mechanism, a solenoid mechanism, or some other actuating means. Cam mechanism 930 is connected to a cam controller 940 (FIG. 10 only) responsible for controlling a lateral position of scrollwheel 812. As cam 931 connected to cam mechanism 930 and slide assembly 920 moves, scrollwheel 812 and body assembly 910 accordingly move laterally. Such lateral movement inwards toward the housing is detectable by the processor of the mobile station as a switch input (actuation or depression of the scrollwheel key).

Although scrollwheel 812 of FIGS. 3, 9, and 10 has been shown and described as the preferred mechanism for use in viewing and selecting visually displayed information, any suitable viewing/selection mechanism may be utilized for the present user interface techniques to be described, such as UP and DOWN keys, a mouse and cursor mechanism, or a touch screen display mechanism.

Figure 6:
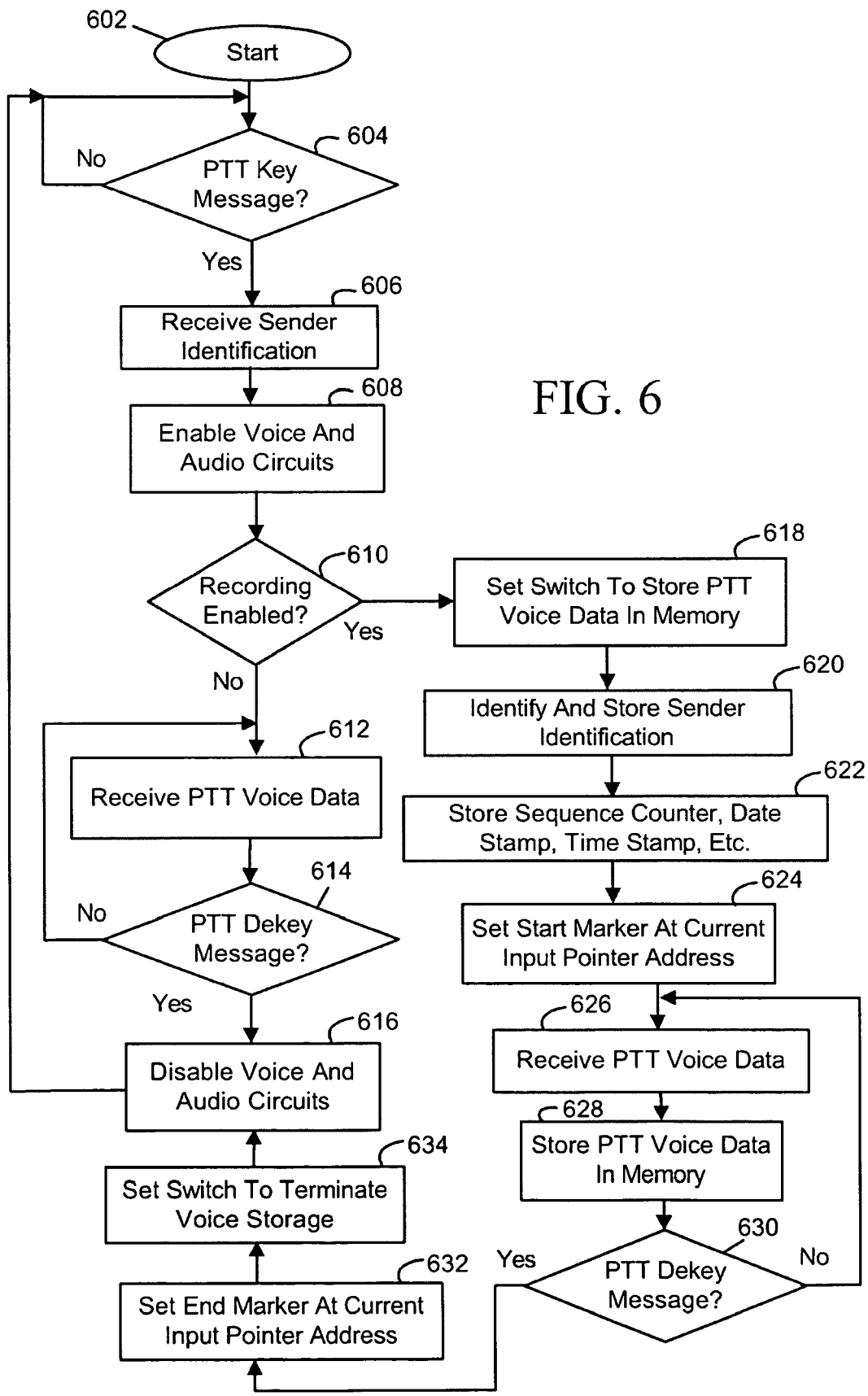
FIG. 6 is a flowchart for describing a method of automatically recording PTT voice communications for replay in a mobile station.

FIG. 6 is a flowchart for describing a method of automatically recording PTT voice communications for replay in a mobile station. This method is performed by a mobile station within the context described above in relation to FIGS. 1-5 and 8-10. In addition, the method may be embodied in a computer program product which includes a storage medium (e.g. computer disk or memory) and computer instructions stored in the storage medium. These computer instructions are performed by one or more processors of the mobile station (e.g. microprocessor, DSP, etc.). In the description that follows, the flowchart of FIG. 6 will be described in combination with the components of FIGS. 4-5.

Beginning at a start block 602 of FIG. 6, a processor of the mobile station identifies whether a PTT key message has been received through the wireless transceiver (step 604 of FIG. 6). A PTT key message is associated with a PTT press of the sending mobile station in the wireless network and signifies a beginning of a PTT voice communication. If the PTT key message has not yet been received, the processor continues to monitor for PTT key messages. If a PTT key message has been received at step 604, an incoming PTT voice communication from the sending mobile station is expected to follow. The processor receives, through the wireless transceiver, a sender identification from the mobile station which will be transmitting the PTT voice communication (step 606 of FIG. 6). The sender identification uniquely identifies the mobile station and may be a telephone number, an IP address, or a direct connect ID, as examples. The processor causes its voice and audio circuits to be enabled (step 608). The voice and audio circuits may include voice decompressor 406, CODEC 404, audio circuit 402, and speaker 234 (FIG. 4).

The processor then identifies whether recording for PTT voice communications is enabled for the mobile station (step 610 of FIG. 6). The recording feature may be an option and may be selectable and settable by a service provider or end user at the user interface of the mobile station. The recording feature may be indicated as a saved "bit flag" in memory of the mobile station. If the processor identifies that the recording feature is not enabled as tested in step 610, then conventional PTT voice communication processing is performed. In this case, voice data for the PTT voice communication is received through the wireless transceiver (step 612 of FIG. 6). This voice data is processed so that audible voice signals are heard from the speaker of the mobile station. For example, RF signals carrying the voice data may be processed by receiver 212, channel decoder and demodulator 408, voice decompressor 406, CODEC 404, and audio circuit 402 so that audible voice signals are delivered through speaker 234 of FIG. 4.

During the receipt and processing of this voice data, the processor monitors whether a PTT dekey message is received (step 614 of FIG. 6). A PTT dekey message corresponds to a PTT release of the sending mobile station and signifies an end of the PTT voice communication. If the PTT dekey message has not yet been received at step 614, the voice data continues to be received and processed by the mobile station. If the PTT dekey is received at step 614, then the processor causes the voice and audio circuits to be disabled (step 616 of FIG. 6) and ceases any further voice processing. The method repeats again starting at step 604.

If the processor identifies that the recording feature is enabled as tested in step 610, however, conventional PTT voice communication processing and recording of the voice data in memory are performed. To begin, the processor performs a switching operation so that the upcoming voice data of the PTT voice communication will be stored in memory (step 618 of FIG. 6). Preferably, memory 412 of FIGS. 4-5 is utilized. The processor also identifies the sender identification (previously received) and stores it in memory in association with the upcoming PTT voice data (step 620 and FIG. 6). Referring to FIG. 5, a sender identification table 550 may be stored in memory for associating sender identifications (e.g. telephone numbers) with corresponding PTT voice communications. Sender identification table 550 in FIG. 5 is shown to have four sender identifications (which correspond to four recorded PTT voice communications) including a sender identification A 570 and a sender identification B 572. Next, a PTT sequence counter, a date stamp, and/or time stamp, as well as any other pertinent information, may also be stored in association with the voice data as well (step 622 of FIG. 6). This information may be received through the wireless transceiver from the sending mobile station or the wireless network, or obtained through applications running in the receiving mobile station.

The processor then sets a start marker at the current input pointer address to mark the beginning of the PTT voice communication (step 624 of FIG. 6). See start marker 502 ("A") of FIG. 5, for example. Next, the voice data for the PTT voice communication is received through the wireless transceiver (step 626 of FIG. 6). The voice data is processed so that audible voice signals are heard through the speaker of the mobile station. In particular, RF signals carrying the voice data may be processed through receiver 212, channel decoder and demodulator 408, voice decompressor 406, CODEC 404, and audio circuit 402 of FIG. 4. Advantageously, the voice data of the PTT voice communication is also simultaneously saved in memory (step 628 of FIG. 6). Preferably, the circular buffer memory 412 of FIGS. 4-5 is utilized for the recording of the PTT voice data as previously described. The first voice data item of the PTT voice communication is stored at the current location of the input pointer address, and subsequent voice data items are stored at the next available locations in sequence.

During the continuous receipt, processing, and storage of voice data of the PTT voice communication, the processor monitors whether a PTT dekey message has been received (step 630 of FIG. 6). If the PTT dekey message has not yet been received as tested in step 630, the voice data continues to be received, processed, and stored in the memory in a sequential fashion. If the PTT dekey is received as tested in step 630, however, then the processor sets an end marker at the current input pointer address (step 632 of FIG. 6). The end marker signifies the end of the PTT voice communication. See end marker 504 ("A") of FIG. 5, for example. The processor then sets the switches so that the voice data storage is terminated (step 634 of FIG. 6). The voice and audio circuits are disabled by the processor (step 616 of FIG. 6).

The storing method may repeat again starting at step 604 for subsequent PTT voice communications. These subsequent PTT voice communications are distinguished in the memory by start and end markers and sender identifications that are different from the initial PTT voice communication. Since a circular buffer memory is utilized (FIG. 5), older PTT voice communications get written over by newer PTT voice communications. Preferably, the visual displaying of information shown and described in relation to FIG. 8 is limited to those stored PTT voice communications that have not been overwritten. That is, if a PTT voice communication gets overwritten by a new incoming PTT voice communication, then it will not appear in the list of PTT voice indicators. When voice data is overwritten, the processor deletes the start and end markers, the sender identification, and other information associated with the PTT voice communication, and does not cause the associated PTT voice indicator to be displayed in the visual display.

The mobile station may also save its own PTT voice communications in its memory in a similar manner, in sequence along with the PTT voice communications received through its receiver. This option provides a more complete history of PTT voice communications stored in memory. In this case, steps 604 and 630 of FIG. 6 correspond to detecting PTT button depressions and PTT button releases, respectively, at the user interface of the mobile station. Upon PTT button depression, the processor causes the voice data of the PTT voice transmission to be stored in the memory simultaneously with its transmission. This voice data may be voice compressed data from an output of its voice compressor (i.e. the same form as the received PTT voice communications). The processor also sets the identification of the PTT voice communication as the mobile station's ID, the date stamp, the time stamp, etc., as appropriate.

Figure 7:
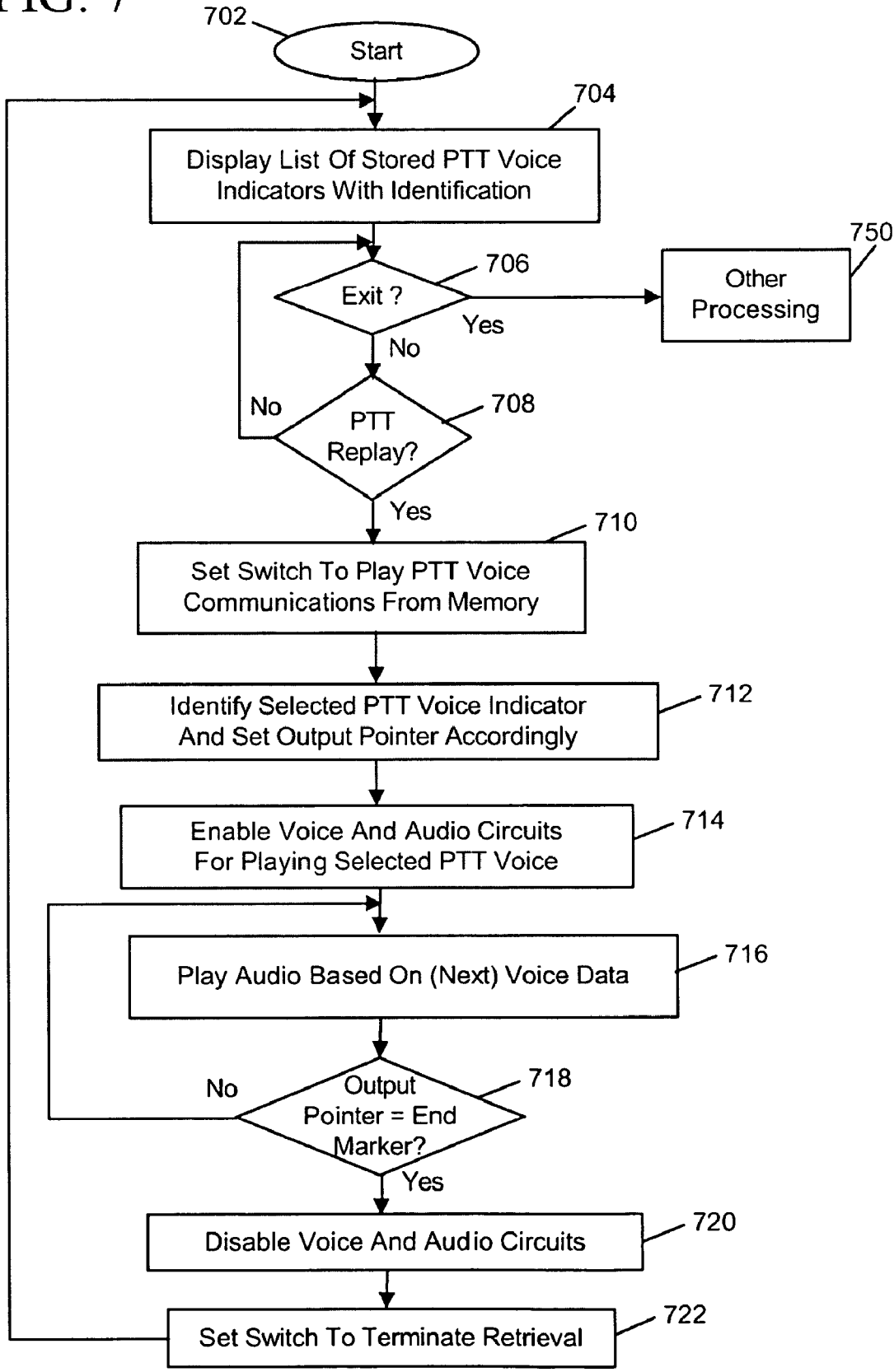
FIG. 7 is a flowchart for describing a method of providing replay of the previously recorded PTT voice communications in the mobile station.

FIG. 7 is a flowchart for describing a method of providing replay of previously recorded PTT voice communications in the mobile station. The recorded PTT voice communications may be those stored in accordance with the previously described flowchart of FIG. 6. This method is performed by a mobile station within the context described above in relation to FIGS. 1-5 and 8-10. In addition, the method may be embodied in a computer program product which includes a storage medium (e.g. computer disk or memory) and computer instructions stored in the storage medium. These computer instructions are performed by one or more processors of the mobile station (e.g. microprocessor, DSP, etc.). In the description that follows, the flowchart of FIG. 7 will be described in combination with the components of FIGS. 4-5 and 8.

Beginning at a start block 702 of FIG. 7, the processor of the mobile station causes a list of stored PTT voice indicators to be displayed in its visual display (step 704 of FIG. 7). Preferably, each stored PTT voice communication is associated with a sender identification and other information which is displayed along with the stored PTT voice indicator. Most preferably, the information and format shown and described in relation to FIG. 8 is utilized. Back to FIG. 7, the processor then monitors user input signals at the user interface. The processor identifies whether an "exit" selection has been detected at the user interface (step 706 of FIG. 7). If so, the processor causes other processing to occur (step 750 of FIG. 7) which is unrelated to the present application. The processor also identifies whether a PTT replay selection has been selected at the user interface (step 708 of FIG. 7). If not, the processor continues monitoring for user inputs at the user interface. Preferably, the selection at the user interface utilizes the techniques previously described in relation to FIG. 8.

If the processor identifies that a PTT replay has been selected at step 708, then the processor causes a switching operation to be performed so that a PTT voice communication stored in the memory can be played or replayed (step 710 of FIG. 7). The processor identifies the PTT voice indicator selected by the end user, and sets the output pointer address to point to the memory location associated with the start marker of the PTT voice communication (step 712 of FIG. 7). The processor also enables the voice and audio circuits for playing the selected PTT voice communication (step 714 of FIG. 7). The voice and audio circuits may include voice decompressor 406, CODEC 404, and audio circuit 402 of FIG. 4. For playing the voice signals, the processor repeatedly increments (or decrements) the output pointer address to retrieve each next voice data item from the memory for processing such that audible voice signals are heard from the speaker (step 716 of FIG. 7). Each voice data item may be compressed voice data which is processed by voice compressor 406, CODEC 404, and audio circuit 402 of FIG. 4. Such operation is performed for all stored voice data of the PTT voice communication until the output pointer address matches the end marker (step 718 of FIG. 7). Once the end marker is reached, the PTT voice communication has ended. The processor disables the voice and audio circuits (step 720) and causes the switches to be set so as to terminate the retrieval of voice data (step 722 of FIG. 7). The method may repeat again for any subsequent PTT voice replays.

Advantageously, PTT voice communications that are missed (e.g. especially the first PTT voice communication of a PTT session) may be replayed by an end user. The recording of PTT voice is performed automatically by the mobile station without the need for effort or involvement by the end user. Using PTT key and dekey messages for recording initiation and recording termination, respectively, conserves memory space as compared to continuous recording over a PTT session. Note that recording of voice is not performed (or performed automatically) for cellular telephone calls, which can be answered or unanswered after an audible or tactile alert at the mobile station.

Final Comments. As described herein, methods and apparatus for automatically recording Push-To-Talk (PTT) voice communications for replay in a mobile station have been described. In one illustrative example, a mobile station includes a wireless transceiver which operates with a wireless communication network; a processor; memory coupled to the processor; and a user interface which includes a Push-To-Talk (PTT) switch for transmitting a PTT voice communication through the wireless transceiver, a PTT replay switch for replaying a PTT voice communication previously received through the wireless transceiver which is stored in the memory, and a speaker for outputting audible voice signals. The wireless transceiver is operative to receive a PTT key message; receive voice data of a PTT voice communication following the PTT key message; and receive a PTT dekey message following the voice data. The processor is operative to cause the voice data of the PTT voice communication to be recorded in the memory based on receiving the PTT key message, and cause the recording of voice data of the PTT voice communication to be terminated based on receiving the PTT dekey message. Subsequently, in response to detecting a user actuation of the PTT replay switch, the processor causes the voice data of the PTT voice communication to be retrieved from the memory and audible voice signals corresponding to the voice data to be output from the speaker.

A wireless communication system of the present application includes a wireless communication network; a Push-to-talk (PTT) server coupled in the wireless network; and one or more mobile stations which operate in the wireless communication network. Each mobile station includes a wireless transceiver which operates with the wireless communication network; one or more processors; memory coupled to the one or more processors; and a user interface which includes a Push-To-Talk (PTT) switch for transmitting a PTT voice communication through the wireless transceiver, a PTT replay switch for replaying a PTT voice communication previously received through the wireless transceiver and stored in the memory, and a speaker for outputting audible voice signals. The wireless transceiver is operative to receive a PTT key message; receive voice data of a PTT voice communication following the PTT key message; and receive a PTT dekey message following the PTT voice communication. The one or more processors are operative to cause the voice data of the PTT voice communication to be recorded in the memory based on receiving the PTT key message; and cause the recording of voice data of the PTT voice communication to be terminated based on receiving the PTT dekey message.

A method of the present application includes the steps of receiving a PTT key message from a mobile station through a wireless communication network; receiving voice data of a PTT voice communication following the PTT key message; causing the voice data of the PTT voice communication to be recorded in memory of the mobile station based on receiving the PTT key message; receiving a PTT dekey message from the mobile station through the wireless communication network; and causing the recording of voice data of the PTT voice communication to be terminated based on receiving the PTT dekey message. A computer program product of the present application includes a storage medium; computer instructions stored in the storage medium; where the computer instructions are executable by one or more processors for performing the method previously described.

The above-described embodiments of the present application are intended to be examples only. For example, the wireless network may be an iDEN network which provides for PTT communications between mobile stations. Those of skill in the art may effect alterations, modifications and variations to the particular embodiments without departing from the scope of the application. The invention described herein in the recited claims intends to cover and embrace all suitable changes in technology.

What is claimed is:

1. A method for a user equipment (UE) in a wireless communication network for recording Push-To-Talk (PTT) over Cellular (PoC) voice communications of a PoC session involving a plurality of PoC users, the method comprising:
receiving a PTT key message from a PoC server configured to perform control functions for the PoC session, the PTT key message being indicative of an incoming PoC voice communication from a PoC user;
receiving and storing an address identifying the PoC user associated with the incoming PoC voice communication;
receiving the incoming PoC voice communication of the PoC user from the PoC server, as indicated by the PTT key message, the incoming PoC voice communication comprising data packets carrying voice information; and
causing the incoming PoC voice communication of the PoC user to be automatically recorded in the UE, in association with the address identifying the PoC user, for replaying at the UE.

2. The method of claim 1, wherein the incoming PoC voice communication is recorded only if the PoC user of the UE enables the recording.

3. The method of claim 1, wherein the address identifying the PoC user comprises a telephone number.

4. The method of claim 1, further comprising:
storing a time stamp for the incoming PoC voice communication; and
wherein the incoming PoC voice communication is recorded in the UE in association with the stored time stamp.

5. The method of claim 1, further comprising:
storing a date stamp for the incoming PoC voice communication; and
wherein the incoming PoC voice communication is recorded in the UE in association with the stored date stamp.

6. The method of claim 1, wherein the recording act is performed for each one of a plurality of incoming PoC voice communications, the PTT key message comprises a first key message, the incoming PoC voice communication comprises a first incoming PoC voice communication, and the address of the PoC user comprises a first address of a first PoC user, the method further comprising:
receiving a second PTT key message from the PoC server configured to perform the control functions for the PoC session, the second PTT key message being indicative of a second incoming PoC voice communication from a second PoC user;
receiving and storing a second address identifying the second PoC user associated with the second incoming PoC voice communication; and
causing the second incoming PoC voice communication of the second PoC user to be automatically recorded in the UE in association with the second address identifying the second PoC user, for replaying at the UE.

7. The method of claim 6, further comprising storing a sender identification table in the UE for respectively associating the first and the second incoming PoC voice communications with the first and the second addresses.

8. The method of claim 1, which is performed by computer instructions stored in a non-transitory computer readable medium and executable by a processor of the UE.

9. A user equipment (UE) which is configured for recording Push-To-Talk (PTT) over Cellular (PoC) voice communications of a PoC session involving a plurality of PoC users, the UE comprising:
a wireless transceiver which operates with a wireless communication network;
one or more processors;
memory coupled to the one or more processors;
a user interface which includes:
a PTT switch for transmitting a PoC voice communication through the wireless transceiver;
a PTT replay switch for replaying a PoC voice communication previously received through the wireless transceiver and stored in the memory;
a speaker for outputting audible voice signals;
the one or more processors being operative to:
receive, via the wireless transceiver, a PTT key message from a PoC server configured to perform control functions for the PoC session, the PTT key message being indicative of an incoming PoC voice communication from a PoC user;

receive, via the wireless transceiver, and store an address identifying the PoC user associated with the incoming PoC voice communication;

receive, via the wireless transceiver, the incoming PoC voice communication of the PoC user from the PoC server, as indicated by the PTT key message, the incoming PoC voice communication comprising data packets carrying voice information; and cause the incoming PoC voice communication of the PoC user to be automatically recorded in the UE in association with the address identifying the PoC user.

10. The UE of claim 9, wherein incoming PoC voice communication is recorded only if the PoC user of the UE enables the recording.

11. The UE of claim 9, wherein the address identifying the PoC user comprises a telephone number.

12. The UE of claim 9, wherein the one or more processors are further operative to:

store a time stamp for the incoming PoC voice communication; and wherein the incoming PoC voice communication is recorded in the UE in association with the stored time stamp.

13. The UE of claim 9, wherein the one or more processors are further operative to:

store a date stamp for the incoming PoC voice communication; and wherein the incoming PoC voice communication is recorded in the UE in association with the stored date stamp.

14. The UE of claim 9, wherein the recording is performed for each one of a plurality of PoC voice communications, the PTT key message comprises a first key message, the incoming PoC voice communication comprises a first incoming PoC voice communication, and the address identifying the PoC user comprises a first address identifying a first PoC user, and wherein the one or more processors are further operative to:

receive a second PTT key message from the PoC server configured to perform the control functions for the PoC session, the second PTT key message being indicative of a second incoming PoC voice communication from a second PoC user;

receive and store a second address identifying the second PoC user associated with the second incoming PoC voice communication; and cause the second incoming PoC voice communication of the second PoC user to be automatically recorded in the UE in association with the second address identifying the second PoC user.

15. The UE of claim 14, wherein the one or more processors are further operative to store a sender identification table in the UE for respectively associating the first and the second incoming PoC voice communications with the first and the second addresses.

16. A wireless communication system, comprising:
a wireless communication network;
a Push-to-talk (PTT) over Cellular (PoC) server coupled in the wireless communication network, the PoC server being configured to perform control functions for a PoC session involving a plurality of PoC users;
one or more user equipments (UEs) which operate in the wireless communication network, each UE including:
a PTT switch for transmitting a PoC voice communication through the wireless transceiver;

a PTT replay switch for replaying a PoC voice communication previously received through the wireless transceiver and stored in the UE;
a speaker for outputting audible voice signals;
each UE being further operative to:
receive a PTT key message from the PoC server configured to perform the control functions for the PoC session, the PTT key message being indicative of an incoming PoC voice communication from a PoC user;
receive and store an address identifying the PoC user associated with the incoming PoC voice communication;
receive the incoming PoC voice communication of the PoC user from the PoC server, as indicated by the PTT key message, the incoming PoC voice communication comprising data packets carrying voice information; and
cause the incoming PoC voice communication of the PoC user to be automatically recorded in the UE in association with the address identifying the PoC user.

17. The wireless communication system of claim 16, wherein the incoming PoC voice communication is recorded only if the PoC user of the UE enables the recording.

18. The wireless communication system of claim 16, wherein the address identifying the PoC user comprises a telephone number.

19. The wireless communication system of claim 16, wherein each UE is further operative to:

store a time stamp for the incoming PoC voice communication; and wherein the incoming PoC voice communication is recorded in the UE in association with the stored time stamp.

20. The wireless communication system of claim 16, wherein each UE is further operative to:

store a date stamp for the incoming PoC voice communication; and wherein the incoming PoC voice communication is recorded in the UE in association with the stored date stamp.

21. The wireless communication system of claim 16, wherein the recording is performed for each one of a plurality of PoC voice communications, the PTT key message comprises a first key message, the incoming PoC voice communication comprises a first incoming PoC voice communication, and the address identifying the PoC user comprises a first address identifying a first PoC user, and wherein each UE is further operative to:

receive a second PTT key message from the PoC server configured to perform the control functions for the PoC session, the second PTT key message being indicative of a second incoming PoC voice communication from a second PoC user;

receive and store a second address identifying the second PoC user associated with the second incoming PoC voice communication; and cause the second incoming PoC voice communication of the second PoC user to be automatically recorded in the UE in association with the second address identifying the second PoC user.

22. The wireless communication system of claim 21, wherein each UE is further operative to store a sender identification table in the UE for respectively associating the first and the second incoming PoC voice communications with the first and the second addresses.

* * * * *